United States Patent [19]
Harkrider

[11] 3,866,840
[45] Feb. 18, 1975

[54] VEHICLE HEADLIGHT DE-FILMING DEVICE

[76] Inventor: John Harkrider, P.O. Box 5671, Irving, Tex. 75062

[22] Filed: Aug. 14, 1973

[21] Appl. No.: 388,238

[52] U.S. Cl............. 240/7.1 R, 15/260.01, 239/284
[51] Int. Cl............................. B60q 1/00, B60q 3/00
[58] Field of Search................. 240/7.1 R; 239/284; 15/250.01

[56] References Cited
UNITED STATES PATENTS

| | | | |
|---|---|---|---|
| 3,117,727 | 1/1964 | Pollock | 240/7.1 R |
| 3,469,088 | 9/1969 | Coleman et al. | 240/7.1 R |
| 3,609,450 | 9/1971 | Hart | 240/7.1 R |

Primary Examiner—Richard A. Wintercorn

[57] ABSTRACT

This device consists primarily of a modified retaining ring for a sealed beam headlight, the ring including a spray nozzle with hose attachment means for connection with the vehicles' window spraying unit.

4 Claims, 3 Drawing Figures

PATENTED FEB 18 1975
3,866,840
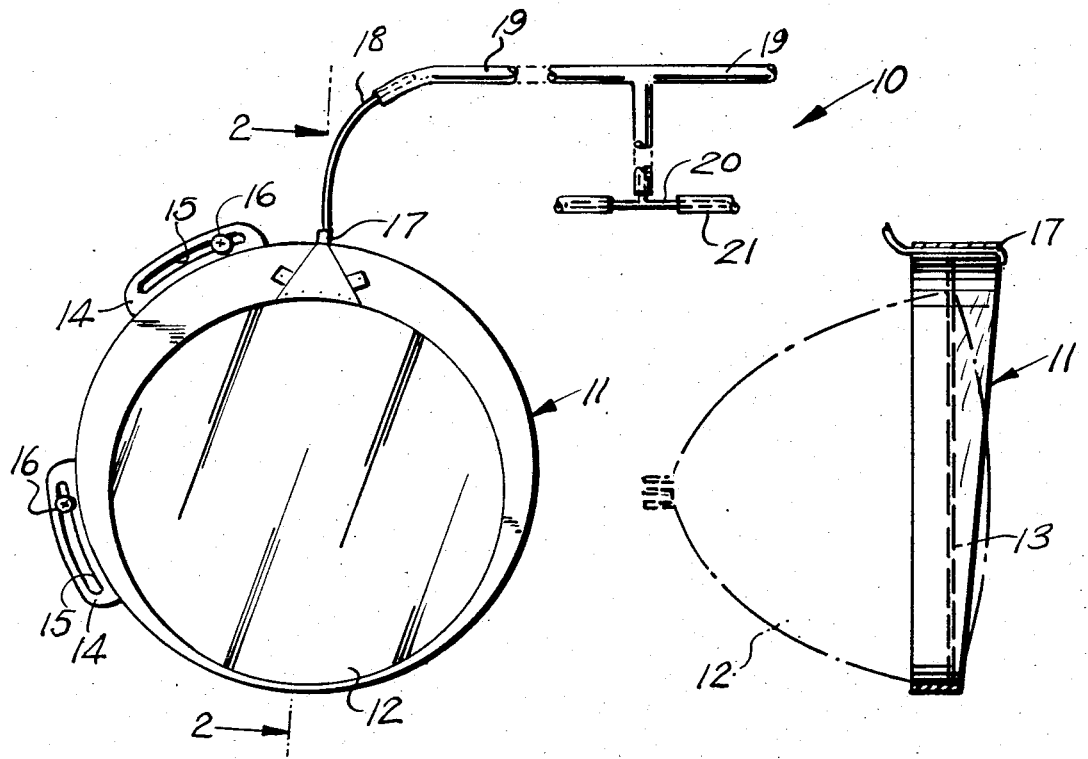
FIG.1
FIG.2
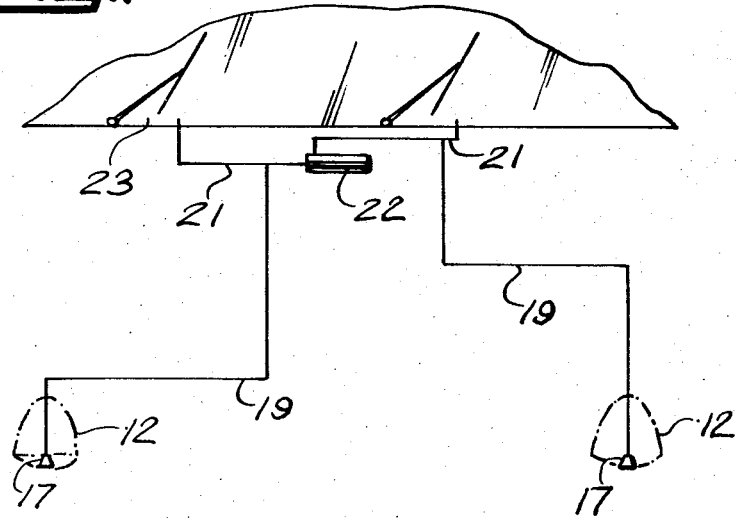
FIG.3

VEHICLE HEADLIGHT DE-FILMING DEVICE

This invention relates to cleaning devices, more particularly to a vehicle headlight de-filming device.

It is therefore the principal object of this invention to provide a de-filming device which will effectively remove the film from headlights of an automotive vehicle.

Another object of this invention is to provide a de-filming device which will include a sealed beam retaining ring in which is secured, fixedly, a spray nozzle attached to the standard window washing pump system of the vehicle.

Still another object of this invention is to provide a de-filming device which when the pump of the window washing unit, is actuated, the sealed beam headlights will simultaneously be washed by spray of water.

Yet another object of this invention is to provide a device of the type described, which may be applied or adapted to, clearance lights and tail lights, the device also providing an added safety measure for operating vehicles.

Other objects of the invention are to provide a de-filming device for automotive vehicles, which is simple in design, inexpensive to manufacture, rugged in construction, easy to use and effecient in operation.

These and other objects will be readily evident upon a study of the following specification together with the accompanying drawing, wherein:

FIG. 1 is a front view of the present invention;

FIG. 2 is a cross-sectional view taken along the line 2—2 of FIG. 1;

FIG. 3 is a diagrammatic top plan view of the present invention.

According to this invention, a de-filming device 10 is shown to include a retaining ring 11 which carries a sealed beam headlight 12 to flange means 13.

A pair of spaced apart ears 14, with slot means 15, provides mounting means for ring 11 to the vehicle, by means of screw fastener 16. A spray nozzle 17 is secured by spot welding or other means, within ring 11 and has an extending tube 18 which is frictionally received within a flexible tubing 19 which is frictionally carried upon a fitting 20 which is fastened to tubing 21 extending from the pump 22 which applies water to windsheild 23 of the vehicle.

It will be noted that the fog-like spray from nozzle 17, first clean the lens of the sealed beam 12 and if desired, the spray to the sealed beam headlights 12 of the vehicle, may be controlled by separate switch device rather than be simultaneously operated when the windshield 23 has water directed upon it by means of pump 22.

What I now claim is:

1. A headlight de-filming device and a vehicle headlight comprising a ring integral with a pair of ears along a periphery thereof, slots in said ears receiving mounting screws secured to a vehicle, said ring being installed around a sealed beam headlight of said vehicle, a spray nozzle secured to said ring, an outlet of said nozzle being adjacent a front edge of said ring, said nozzle being connected by flexible hose means through a pump to a windshield washer water supply.

2. The combination according to claim 1, wherein said retaining ring of said device includes a concentric opening for receiving said sealed beam headlight and said flange of said ring embraces the outer periphery of the large diameter portion of said sealed beam.

3. The combination according to claim 2, wherein said spray nozzle is secured fixedly within said ring so as to direct water spray under pressure downwards upon and against the lens of said sealed beam to thus remove the film therefrom.

4. The combination according to claim 3, wherein said spray nozzle connected by flexible hose means through fittings so as to direct water from the pump supplying said water, simultaneously to each of said headlights.

* * * * *